(12) United States Patent
Ko et al.

(10) Patent No.: US 10,601,111 B2
(45) Date of Patent: Mar. 24, 2020

(54) BEAM FORMING AUXILIARY UNIT FOR ANTENNA AND TERMINAL INCLUDING THE SAME

(71) Applicant: Samsung Electronics Co., Ltd., Suwon-si (KR)

(72) Inventors: Seungtae Ko, Suwon-si (KR); Jungsuek Oh, Incheon (KR); Youngju Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/822,781

(22) Filed: Nov. 27, 2017

(65) Prior Publication Data

US 2018/0191059 A1    Jul. 5, 2018

(30) Foreign Application Priority Data

Dec. 30, 2016    (KR) .......................... 10-2016-0184363

(51) Int. Cl.
*H01Q 1/22*    (2006.01)
*H01Q 1/24*    (2006.01)
(Continued)

(52) U.S. Cl.
CPC .............. *H01Q 1/243* (2013.01); *H01Q 3/30* (2013.01); *H01Q 3/40* (2013.01);
(Continued)

(58) Field of Classification Search
CPC .................................. H01Q 1/243; H01Q 3/30
(Continued)

(56) References Cited

U.S. PATENT DOCUMENTS

| | | |
|---|---|---|
| 5,048,118 A | 9/1991 | Brooks et al. |
| 2001/0047875 A1 | 12/2001 | Son |

(Continued)

FOREIGN PATENT DOCUMENTS

| | | |
|---|---|---|
| EP | 2 493 009 A2 | 8/2012 |
| JP | 2001-36316 A | 2/2001 |

OTHER PUBLICATIONS

Extended European Search Report dated Oct. 29, 2019, issued in European Patent Application No. 17885814.8.

*Primary Examiner* — Peguy Jean Pierre
(74) *Attorney, Agent, or Firm* — Jefferson IP Law, LLP (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A terminal is provided. The terminal includes a metal bezel disposed along an edge of the terminal, an antenna incorporated into the terminal and configured to emit electronic waves, and a beam forming auxiliary unit incorporated into the terminal, separately disposed by a predetermined distance from the antenna, and configured such that the electronic waves emitted from the antenna pass through the metal bezel.

18 Claims, 12 Drawing Sheets

(51) Int. Cl.
*H01Q 15/00* (2006.01)
*H01Q 19/28* (2006.01)
*H01Q 3/30* (2006.01)
*H01Q 3/40* (2006.01)
*H01Q 21/22* (2006.01)
*H01Q 15/23* (2006.01)
*H01Q 19/06* (2006.01)
*H01Q 21/00* (2006.01)
*H04B 7/06* (2006.01)

(52) U.S. Cl.
CPC ......... *H01Q 15/0013* (2013.01); *H01Q 19/28* (2013.01); *H01Q 21/22* (2013.01); *H01Q 15/23* (2013.01); *H01Q 19/06* (2013.01); *H01Q 21/0075* (2013.01); *H04B 7/0617* (2013.01)

(58) Field of Classification Search
USPC ........................................................ 343/725
See application file for complete search history.

(56) References Cited

U.S. PATENT DOCUMENTS

| | | |
|---|---|---|
| 2005/0057420 A1* | 3/2005 | Lin .................... H01Q 1/22 343/818 |
| 2008/0111749 A1 | 5/2008 | Nam |
| 2011/0001673 A1 | 1/2011 | You et al. |
| 2011/0136447 A1 | 6/2011 | Pascolini et al. |
| 2012/0046002 A1 | 2/2012 | Hill et al. |
| 2012/0218723 A1 | 8/2012 | Kwak et al. |
| 2015/0255856 A1 | 9/2015 | Hong et al. |
| 2015/0312058 A1 | 10/2015 | Black et al. |
| 2016/0064804 A1* | 3/2016 | Kim ................... H01Q 1/243 343/702 |
| 2016/0088129 A1* | 3/2016 | Zhang ............... B21D 22/02 455/575.1 |
| 2016/0118713 A1 | 4/2016 | Hong et al. |
| 2017/0170562 A1* | 6/2017 | Lee .................... H01Q 1/243 |
| 2018/0054503 A1* | 2/2018 | Park .................. H04M 1/0266 |
| 2018/0102586 A1* | 4/2018 | Shin ................... H01Q 5/314 |

* cited by examiner

BEAM FORMING AUXILIARY UNIT FOR ANTENNA AND TERMINAL INCLUDING THE SAME

CROSS-REFERENCE TO RELATED APPLICATION(S)

This application claims the benefit under 35 U.S.C. § 119(a) of a Korean patent application filed on Dec. 30, 2016 in the Korean Intellectual Property Office and assigned Serial number 10-2016-0184363, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD., and 2) Inha University Research and Business Foundation.

TECHNICAL FIELD

The present disclosure relates to a beam forming auxiliary unit for an antenna and a terminal including the same. More particularly, the present disclosure relates to a beam forming auxiliary unit for an antenna such that the beam forming auxiliary unit emits electronic waves that are emitted from the antenna, which is incorporated in a terminal, to the outside of the terminal without distortion.

BACKGROUND

Efforts are being made to develop an enhanced fifth generation (5G) communication system or a pre-5G communication system in order to satisfy increases in demand for wireless data traffic now that a fourth generation (4G) communication system is commercially available. A 5G communication system or a pre-5G communication system is referred to as a beyond 4G network communication system or a post long term evolution (LTE) system. In order to achieve a high data transmission rate, consideration is being given to implementing the 5G communication system in a millimeter wave (mm Wave) band (e.g., 60 GHz band). In order to mitigate any route loss of electronic waves in a mm Wave band and increase transmission distances of electronic waves, the technologies of beamforming, massive multiple input and output (MIMO), full dimensional MIMO (FD-MIMO), array antenna, analog beamforming, and large scale antenna have been discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (COMP), and interference cancellation have been developed. In addition, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access technologies, have been developed for the 5G system.

Innovation of the Internet from a human-based connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has appeared. In order to implement the IoT, technology elements such as sensing technology, wired and wireless communication and network infrastructure, service interface technology, and security technology are required. Thus, nowadays, research is being carried out on technology of a sensor network, machine to machine (M2M) communication, and machine type communication (MTC) for connection between things. In an IoT environment, an intelligent Internet technology service that collects and analyzes data generated in connected things to provide a new value to a human life may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts to apply a 5G communication system to an IoT network have been performed. For example, technologies such as a sensor network, M2M communication, and MTC have been implemented by the techniques of beamforming, MIMO, and array antenna, which are 5G communication technology. Application of a cloud RAN as the foregoing big data processing technology may be an example of fusion of 5G technology and IoT technology.

Because a 5G communication system uses an ultrahigh frequency band as an electronic wave band, the coverage range of electronic waves is extremely limited. For example, because electronic waves of an ultrahigh frequency band have a strong straight property and a low diffraction property, loss of the electronic waves may be increased by an obstacle (e.g., building or geographic feature).

In order to prevent such a loss, nowadays, a lens used at an initial operation of microwave communication has been in the spotlight. The lens used for an antenna may be used for enhancing a gain and/or coverage of electronic waves using a principle similar to that of an optical lens.

An antenna used for a terminal in a 5G communication system may be incorporated into a terminal because of the foregoing characteristics thereof. Thus, a distortion may occur in an emission pattern thereof.

In particular, a distortion may occur in an emission pattern owing to a metal bezel that encloses an edge of the terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure has been made in view of the above problem and provides a terminal that can minimize a distortion of an emission pattern owing to a metal bezel through a beam forming auxiliary unit.

In accordance with an aspect of the present disclosure, a terminal is provided. The terminal includes a metal bezel disposed along an edge of the terminal, an antenna incorporated into the terminal and configured to emit electronic waves, and a beam forming auxiliary unit incorporated into the terminal, separately disposed by a predetermined distance from the antenna, and configured such that the electronic waves emitted from the antenna pass through the metal bezel.

Preferably, a pattern is formed at one surface of the beam forming auxiliary unit that faces the electronic waves emitted through the antenna such that the electronic waves emitted from the antenna pass through the metal bezel.

Preferably, when the electronic waves emitted through the antenna collide with the pattern, an advancing speed of the electronic waves colliding with the pattern reduces.

Preferably, when the electronic waves emitted through the antenna collide with the pattern, a propagation constant of the electronic waves colliding with the pattern increases.

Preferably, the electronic waves having a reduced advancing speed due to an increase of the propagation constant are emitted to the outside of the terminal without distortion.

Preferably, unit patterns having a constant shape are periodically arranged in the pattern.

Preferably, the antenna is a beamforming antenna, and the predetermined distance is smaller than a wavelength of the beamforming antenna.

Preferably, the beam forming auxiliary unit is attached to one surface of the metal bezel, and the one surface of the metal bezel includes at least one port.

Preferably, the beam forming auxiliary unit is attached to one surface of the metal bezel, and one surface of the metal bezel is divided into a plurality of areas.

Preferably, the beam forming auxiliary unit is a plane lens.

In accordance with another aspect of the present disclosure, a terminal is provided. The terminal includes a metal bezel disposed along an edge of the terminal, an antenna incorporated into the terminal and configured to emit electronic waves, and a beam forming auxiliary unit incorporated into the terminal and separately disposed by a predetermined distance from the antenna. The beam forming auxiliary unit includes a film layer configured to compensate a phase of the electronic waves emitted through the antenna, and a pattern layer configured such that the electronic waves emitted through the antenna pass through the metal bezel.

Preferably, a pattern is formed at one surface of the pattern layer such that the electronic waves emitted from the antenna pass through the metal bezel.

Preferably, the pattern layer includes a first area made of a metal and a second area made of a dielectric material.

Preferably, unit patterns having a constant shape are periodically arranged in the pattern layer.

Preferably, when the electronic waves emitted through the antenna collide with the pattern layer, the pattern layer increases a propagation constant of the electronic waves colliding therewith.

Preferably, the electronic waves having a reduced advancing speed due to an increase of the propagation constant are emitted to the outside of the terminal without distortion.

In accordance with another aspect of the present disclosure, an antenna assembly is provided. The antenna assembly includes an antenna configured to emit electronic waves, and a beam forming auxiliary unit separately disposed by a predetermined distance from the antenna and configured to reduce an advancing speed of the electronic waves emitted from the antenna.

Preferably, a pattern is formed at one surface of the beam forming auxiliary unit that faces the electronic waves emitted through the antenna to reduce the advancing speed of the electronic waves emitted from the antenna.

Preferably, when the electronic waves emitted through the antenna collide with the pattern, a propagation constant of the electronic waves colliding with the pattern increases.

Preferably, unit patterns having a constant shape are periodically arranged in the pattern.

Preferably, the beam forming auxiliary unit is a plane lens.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Similarly, in the attached drawings, some constituent elements are shown in an exaggerated or schematic form or are omitted. Further, a size of each constituent element does not entirely reflect an actual size. Like reference numerals designate like elements in the drawings.

These advantages and features of the present disclosure and a method of accomplishing them will become more readily apparent from the detailed description given hereinafter together with the accompanying drawings. However, the present disclosure is not limited to the following various embodiments, and it may be implemented in different forms. The present embodiments enable the complete disclosure of the present disclosure and are provided to enable complete knowledge of the scope of the disclosure to those skilled in the art, and the present disclosure is defined by the scope of the claims. Like reference numerals designate like elements throughout the specification.

Herein, it may be understood that each block of a flowchart and combinations of the flowchart may be performed by computer program instructions. Because these computer program instructions may be mounted in a processor of a universal computer, a special computer, or other programmable data processing equipment, the instructions performed through a processor of a computer or other programmable data processing equipment generate a means that performs functions described in a block(s) of the flowchart. In order to implement a function with a specific method, because these computer program instructions may be stored at a computer available or computer readable memory that can direct a computer or other programmable data processing equipment, instructions stored at the computer available or computer readable memory may produce a production item including an instruction means that performs a function described in a block(s) of the flowchart. Because computer program instructions may be mounted on a computer or other programmable data processing equipment, a series of operational steps are performed on the computer or other programmable data processing equipment and generate a process executed with the computer, and instructions that direct the computer or other programmable data processing equipment may provide operational steps for executing functions described in a block(s) of the flowchart.

Further, each block may represent a portion of a module, segment, or code including at least one executable instruction for executing a specific logical function(s). Further, in several replaceable execution examples, it should be noted that functions described in blocks may be performed regardless of order. For example, two consecutively shown blocks may be substantially simultaneously performed or may be sometimes performed in reverse order according to a corresponding function.

In this case, a term "-unit" used in the present embodiment means a software or hardware component such as a field programmable gate array (FPGA) or an application specific integrated circuit (ASIC) and performs any function. However, "-unit" is not limited to software or hardware. A "-unit" may be configured to store at a storage medium that can address and may be configured to reproduce at least one processor. Therefore, "-unit" includes, for example, components (such as software components, object-oriented software components, class components, and task components), processes, functions, attributes, procedures, subroutines, segments of a program code, drivers, firmware, microcode, circuit, data, database, data structures, tables, arrays, and variables. A function provided within constituent elements and "-units" may be performed by coupling the smaller number of constituent elements and "-units" or by subdividing the constituent elements and "-units" into additional constituent elements and "-units". Further, constituent elements and "-units" may be implemented in a manner to reproduce at least one central processing unit (CPU) within a device or a security multimedia card. Further, in an embodiment, "-unit" may include at least one processor.

Figure 1A:
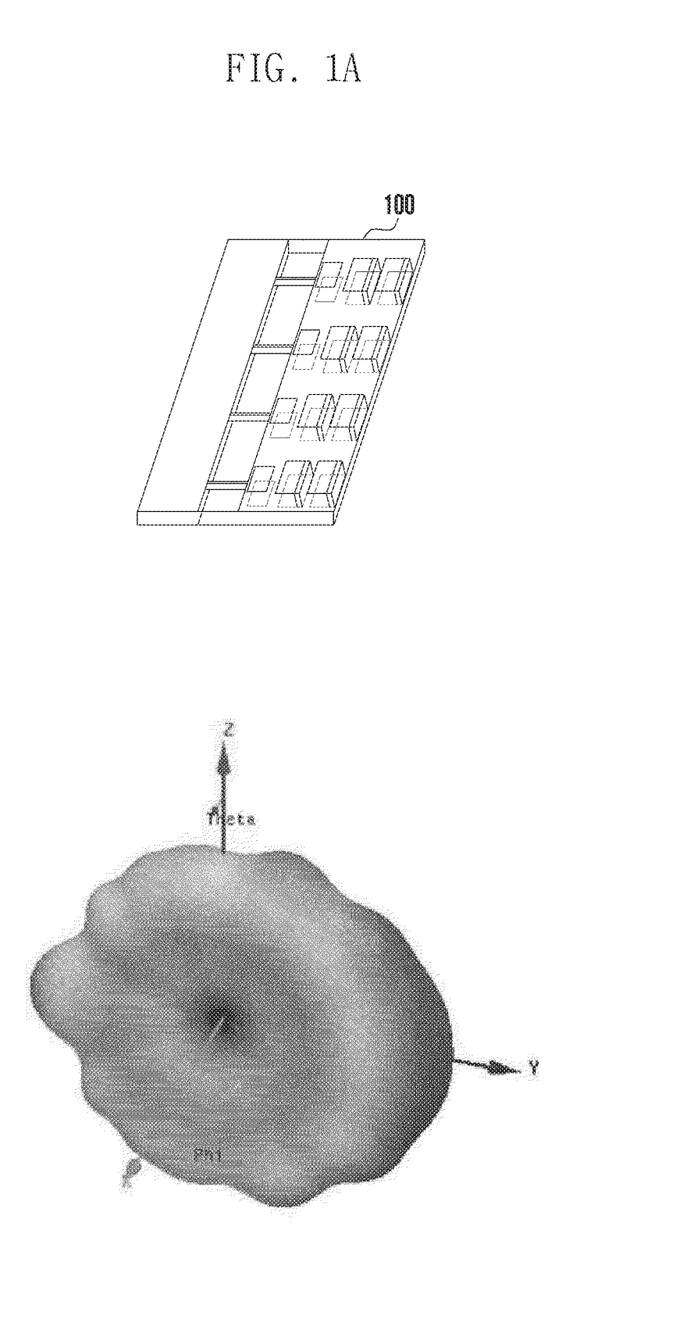
FIG. 1A is a diagram illustrating an emission pattern of an antenna at an open space according to an embodiment of the present disclosure.

FIG. 1A is a diagram illustrating an emission pattern of an antenna at an open space according to an embodiment of the present disclosure.

An open space indicates a case in which both a parallel direction component and a normal direction component of an electromagnetic field exist and means a space in which electronic waves emitted through an antenna or an electromagnetic wave emission device may be emitted to the outside without distortion.

Referring to FIG. 1A, in an emission pattern of an antenna 100, it may be determined that emission patterns are uniformly formed in an entire area in which electronic waves are emitted. That is, electronic waves emitted through the antenna 100 are emitted to the outside without distortion.

Figure 1B:
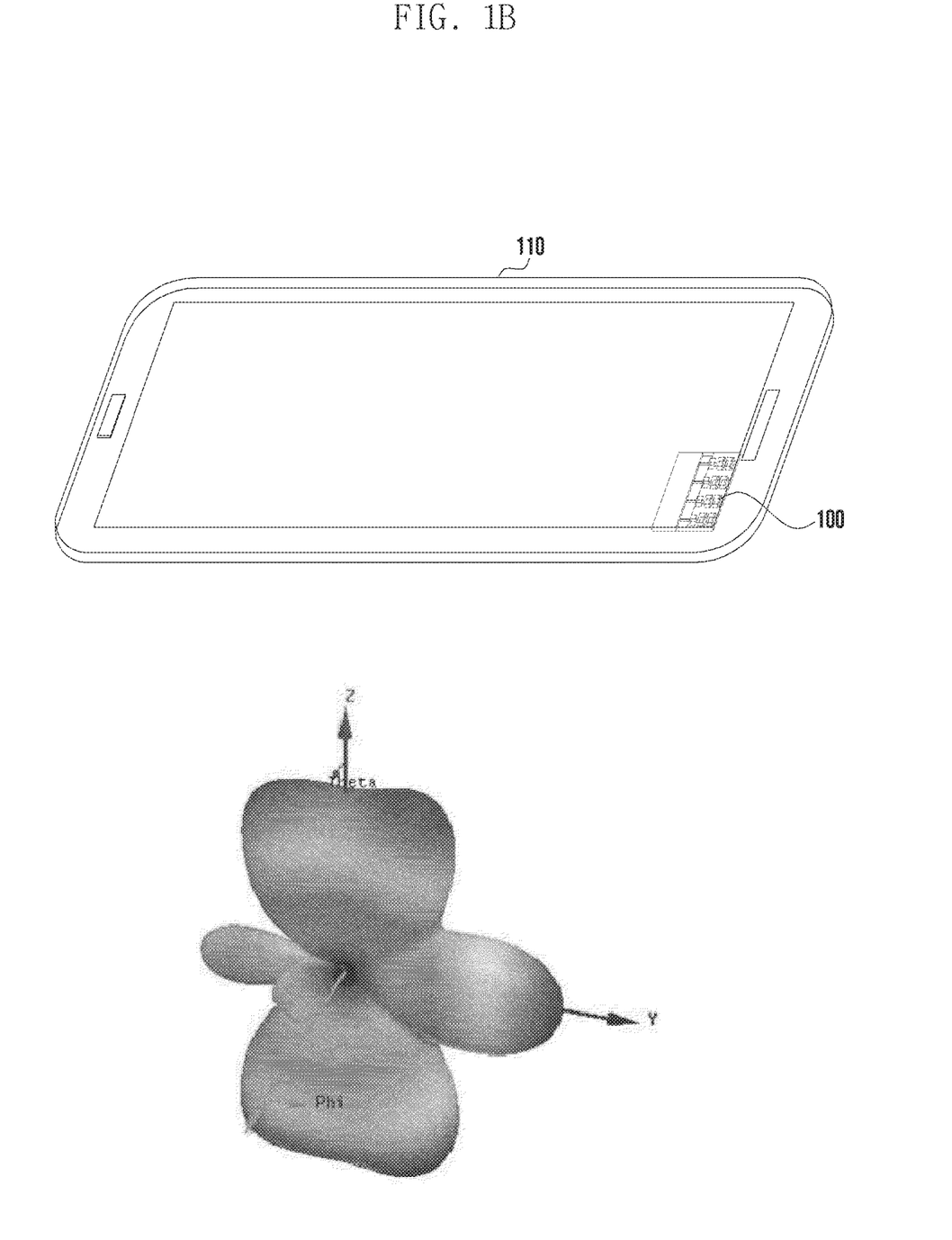
FIG. 1B is a diagram illustrating an emission pattern of an antenna when the antenna is incorporated into a terminal including a metal bezel according to an embodiment of the present disclosure.

FIG. 1B is a diagram illustrating an emission pattern of an antenna when the antenna is incorporated into a terminal including a metal bezel.

Referring to FIG. 1B, a bezel 110 generally applied to the terminal may be disposed along an edge of the terminal. Further, the bezel 110 may be made of various materials such as a metal material or a plastic material.

When the bezel 110 is made of a plastic material, electronic waves emitted through the antenna 100 are emitted to the outside of the terminal without distortion. Thus, a problem does not occur in communication between the terminal and a base station.

However, when the bezel 110 is made of a metal or includes a metal material, electronic waves emitted through the antenna 100 may be distorted by the bezel 110. In particular, in a millimeter wave (mm Wave) antenna used for fifth generation (5G) communication, an emission performance of the antenna 100 may be deteriorated by the metal of the bezel 110 because of a short wavelength.

Such emission performance deterioration may be determined through an emission pattern of the antenna 100 of FIG. 1B. In the emission pattern of FIG. 1B, it may be determined that the emission pattern is not formed in a specific area. That is, in the specific area, electronic waves emitted through the antenna are distorted.

Therefore, through an emission pattern comparison of FIGS. 1A and 1B, when an antenna is incorporated into a terminal including a metal bezel, it may be determined that a distortion occurs in electronic waves emitted to the outside of the terminal through the antenna.

Figure 2:
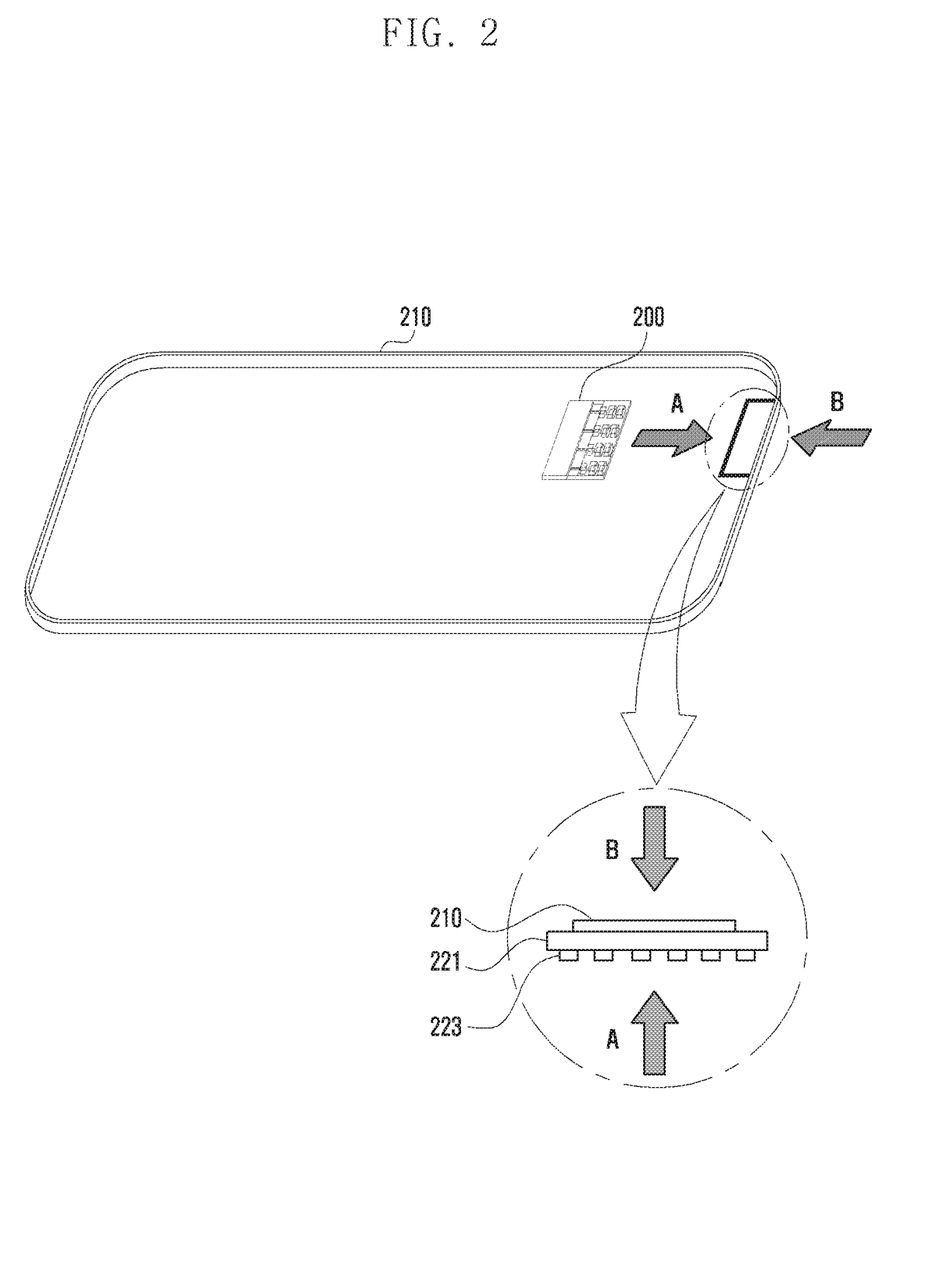
FIG. 2 is a diagram illustrating a configuration of a terminal including a beam forming auxiliary unit according to an embodiment of the present disclosure.

FIG. 2 is a diagram illustrating a configuration of a terminal including a beam forming auxiliary unit according to an embodiment of the present disclosure.

The beam forming auxiliary unit described in the present embodiment performs a function of compensating a phase of a beam generated through the antenna and again emitting the beam, and a phase of emission energy of the antenna that passes through the beam forming auxiliary unit is converted. Thus, an emission direction and an energy magnitude may be changed. That is, the beam forming auxiliary unit assists in the forming of beams emitted through the antenna and may include a lens.

Referring to FIG. 2, the terminal includes a metal bezel 210 disposed along an edge thereof, an antenna 200 incorporated therein to emit electronic waves, and a beam forming auxiliary unit 220 incorporated therein and separately disposed by a predetermined distance from the antenna 200.

One surface of the beam forming auxiliary unit 220 facing electronic waves emitted through the antenna 200 may have a pattern, as shown in FIG. 2. The reason of forming a pattern at one surface of the beam forming auxiliary unit 220 is to reduce an advancing speed of electronic waves emitted through the antenna 200.

When an advancing speed of electronic waves emitted from the antenna is slowed down, even if a metal is put in an advancing direction of the electronic waves, the electronic waves are not distorted by the metal. Therefore, in the present embodiment, in order to use such a characteristic, in the beam forming auxiliary unit 220 facing electronic waves emitted through the antenna 200, a pattern is formed to lower an advancing speed of electronic waves emitted through the antenna 200.

Specifically, when electronic waves emitted through the antenna 200 collide with the pattern, a propagation constant of the electronic waves colliding with the pattern increases. Here, the propagation constant is a constant defined by Equation 1.

$$k=(2\pi f)\sqrt{\mu\varepsilon}$$
Equation 1

In Equation 1, k is the propagation constant, f is the frequency, $\mu$ is the permeability, and $\varepsilon$ is the dielectric constant.

In Equation 1, the permeability represents a level, with a rate, in which a formed magnetic field disturbs electronic waves from advancing, and a dielectric constant represents a level, with a rate, in which a formed electric field disturbs electronic waves from advancing. Therefore, as permeability and a dielectric constant increase, a propagation constant has a large value. Thus, an advancing speed of the electronic waves reduces.

The pattern is formed at one surface facing electronic waves emitted through an antenna, and a method of forming a pattern in the beam forming auxiliary unit and a method of configuring a beam forming auxiliary unit with a film layer 221 and a pattern layer 223, as shown in an enlarged view of FIG. 2, may be considered.

The film layer 221 receives energy emitting from the antenna 200 to compensate a phase thereof, and a phase of emission energy passed through the film layer 221 is changed. Thus, an emission direction or an energy magnitude may be changed.

As described above, the pattern layer 223 reduces an advancing speed of electronic waves emitted through the antenna 200. Thus, the electronic waves emitted through the antenna 200 may be emitted to the outside of the metal bezel 210 without distortion.

In the present embodiment, a description is made stating that electronic waves emitted through an antenna may pass through a metal having a bezel shape to be emitted to the outside, but the present disclosure is not limited thereto.

When an advancing speed of electronic waves emitted through the antenna is slowed down by the pattern layer, the electronic waves may pass through a metal having any shape without distortion, thereby recovering a loss of an antenna gain and coverage by the metal.

Figure 3:
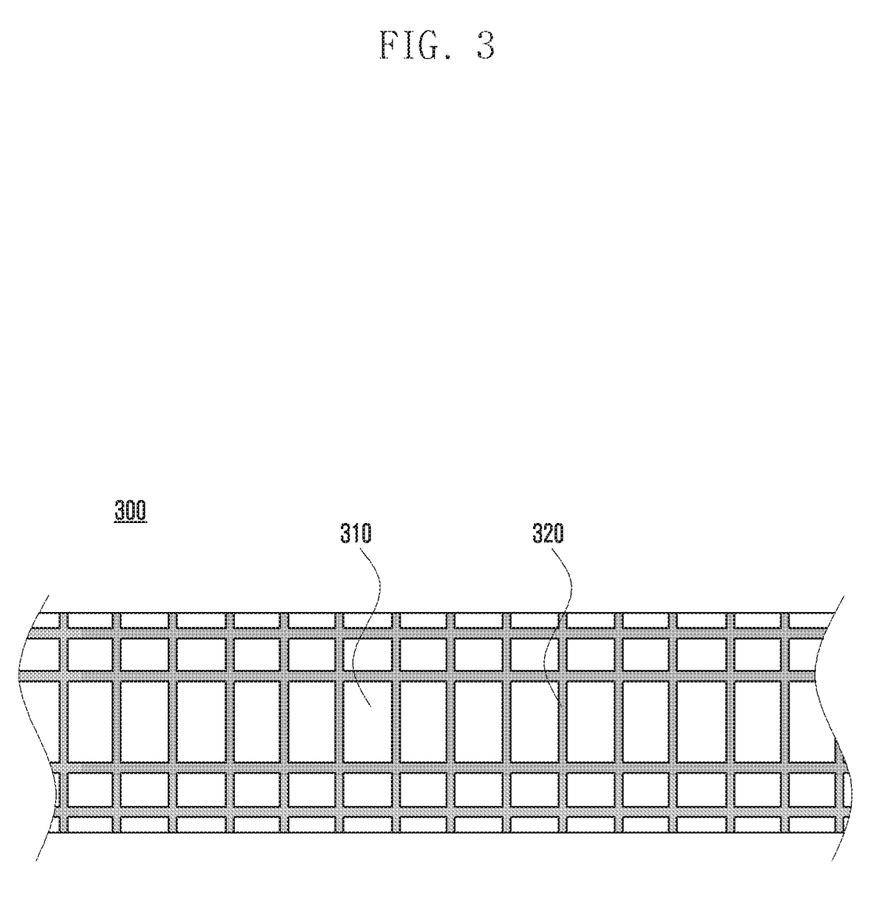
FIG. 3 is a diagram illustrating a pattern shape of a beam forming auxiliary unit according to an embodiment of the present disclosure.

The pattern layer may be formed in various shapes, and FIG. 3 illustrates a pattern shape of a beam forming auxiliary unit according to an embodiment of the present disclosure.

Referring to FIG. 3, a pattern layer 300 may include a first area 310 made of a metal and a second area 320 made of a dielectric material, and the pattern layer 300 may be formed through a periodic disposition of the first area 310 and the second area 320.

Specifically, unit patterns having a constant shape may be periodically arranged in the pattern layer 300.

FIG. 3 illustrates a case in which a unit pattern is a lattice pattern, and a lattice pattern having the same shape may be periodically disposed at the pattern layer 300 according to an embodiment of the present disclosure. Here, a unit pattern is a unit constituting the pattern layer 300, and the unit patterns are periodically arranged in the plural to configure one pattern layer for the pattern layer 300.

Figure 4:
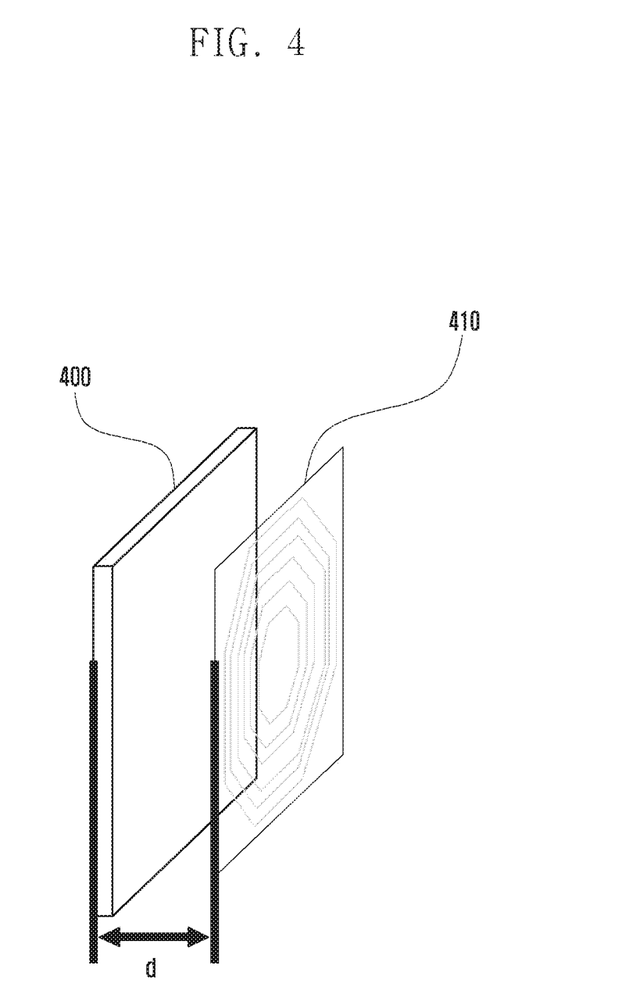
FIG. 4 is a diagram illustrating a disposition structure of an antenna and a beam forming auxiliary unit according to an embodiment of the present disclosure.

FIG. 4 is a diagram illustrating a disposition structure of an antenna and a beam forming auxiliary unit according to an embodiment of the present disclosure.

Referring to FIG. 4, a beam forming auxiliary unit 410 according to an embodiment of the present disclosure is separately disposed by a predetermined distance d from an antenna 400. As described above, because the beam forming auxiliary unit 410 generally performs a function of compensating a phase of electronic waves, a separation distance d between the beam forming auxiliary unit 410 and the antenna 400 is an important element in determining a performance of the beam forming auxiliary unit.

In particular, in a mm Wave antenna used for 5G communication, when a separation distance d between the beam forming auxiliary unit 410 and the antenna 400 is equal to or larger than a specific value, a performance of the beam forming auxiliary unit 410 is rapidly deteriorated.

Therefore, in the present embodiment, when the antenna 400 that emits electronic waves is a mm Wave antenna, such as a beamforming antenna, a method of setting a separation distance d between the beam forming auxiliary unit 410 and the beamforming antenna to be smaller than a wavelength of the beamforming antenna 400 is described, thereby preventing a performance of the beam forming auxiliary unit 410 from being deteriorated.

Further, as shown in FIG. 4, when configuring the beam forming auxiliary unit 410 with a plane lens, an occupying area of the beam forming auxiliary unit 410 within the terminal may be minimized.

Figure 5A:
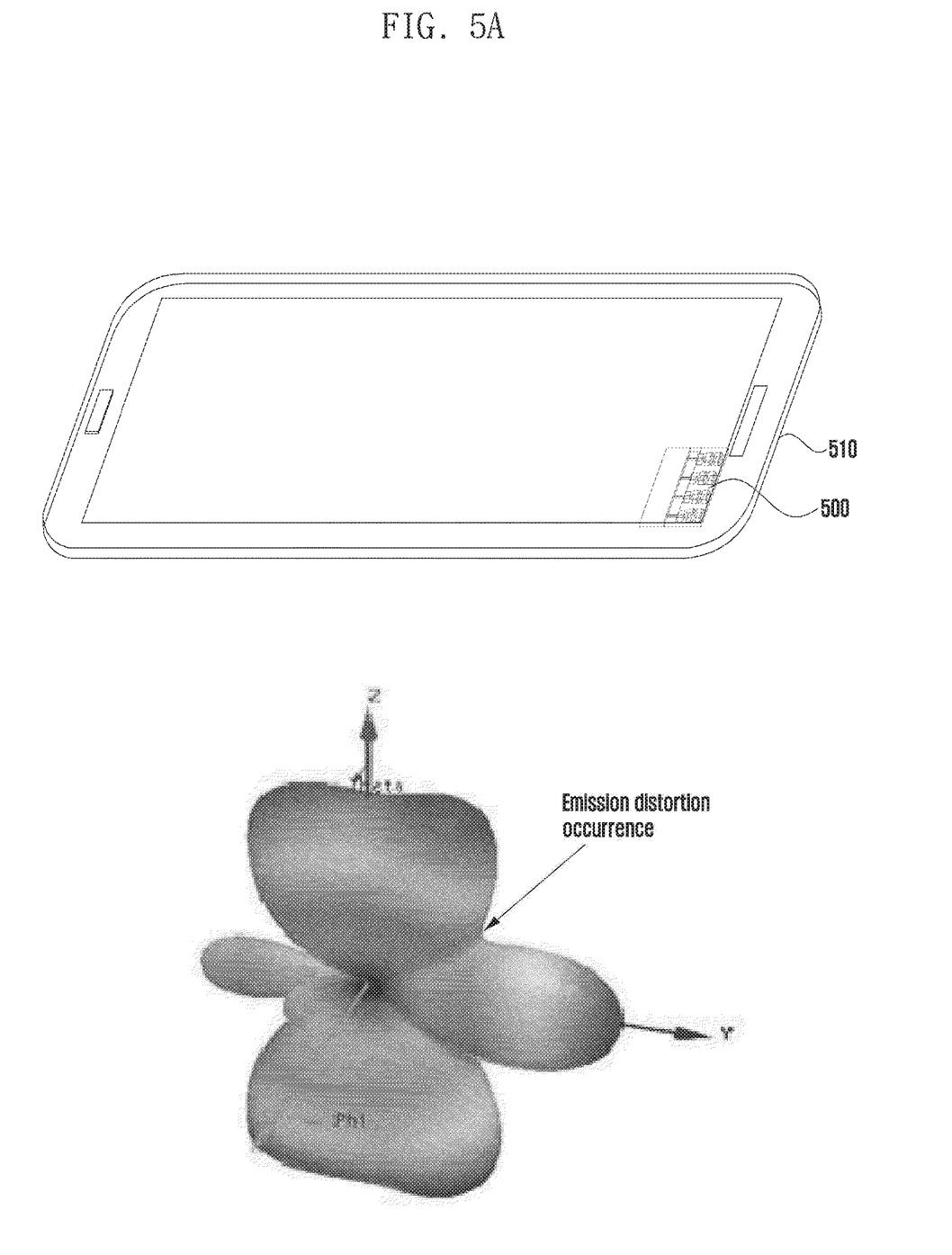
FIG. 5A is a diagram illustrating an emission pattern of an antenna when the antenna is incorporated into a terminal including a metal bezel according to an embodiment of the present disclosure.

FIG. 5A is a diagram illustrating an emission pattern of an antenna when the antenna is incorporated into a terminal including a metal bezel according to an embodiment of the present disclosure.

Referring to FIG. 5A, when an antenna 500 is incorporated into a terminal including a metal bezel 510, it may be determined that a distortion occurs in an emission pattern of electronic waves emitted through the antenna 500.

This is because a portion of electronic waves emitted through an antenna is reflected or scattered by the metal bezel 510 so as not to be emitted to the outside of the terminal, and smooth communication cannot be performed between the terminal and a base station because of the distortion.

Figure 5B:
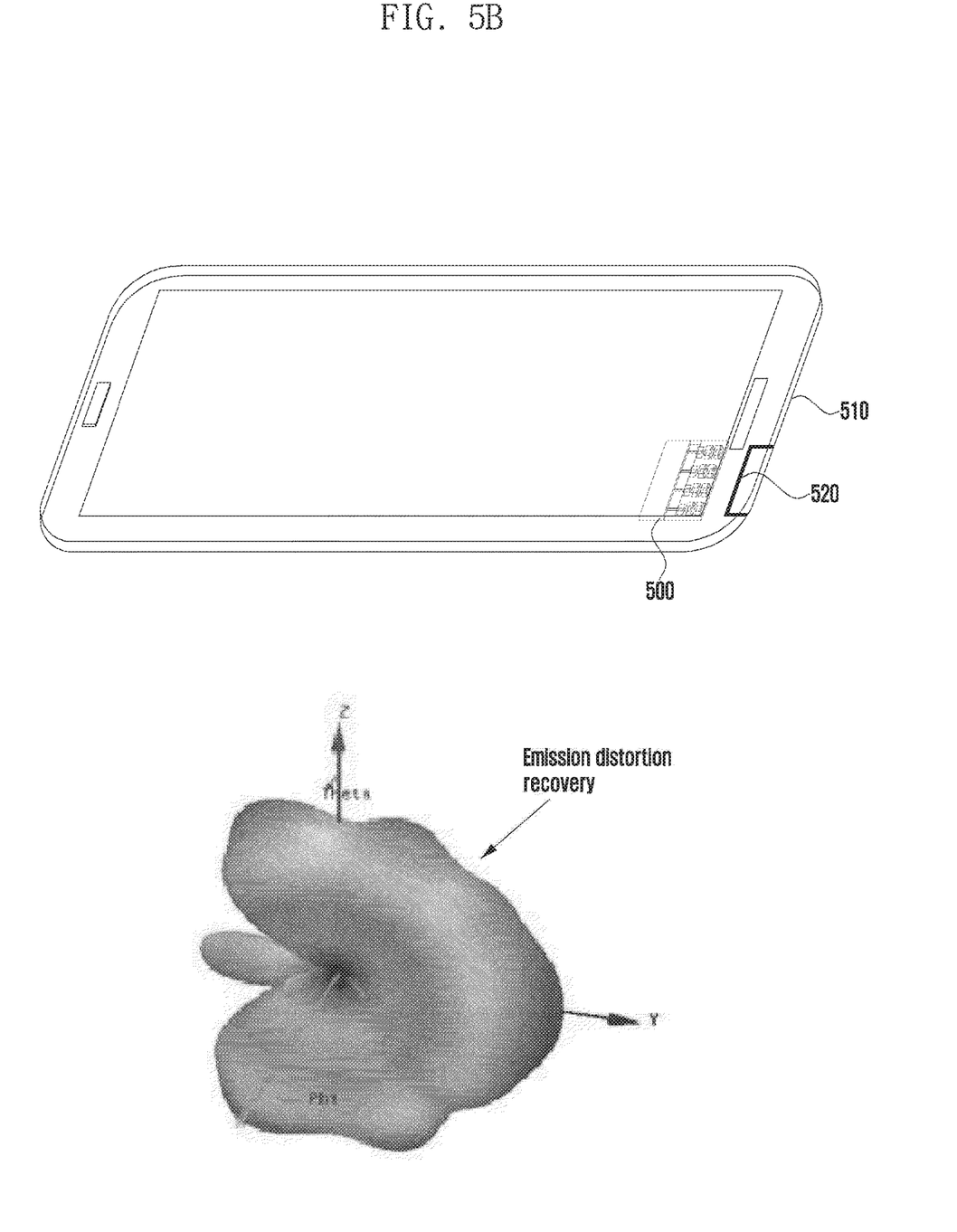
FIG. 5B is a diagram illustrating an emission pattern of an antenna when the antenna is incorporated into a terminal including a beam forming auxiliary unit according to an embodiment of the present disclosure.

FIG. 5B is a diagram illustrating an emission pattern of an antenna when the antenna is incorporated into a terminal including a beam forming auxiliary unit in which a pattern is formed and illustrating an emission pattern when a lens is configured as a beam forming auxiliary unit according to an embodiment of the present disclosure.

Specifically, a kind and disposition position of the antenna 500 and the metal bezel 510 of FIG. 5B are the same as those of the antenna 500 and the metal bezel 510 of FIG. 5A.

Referring to FIG. 5B, a beam forming auxiliary unit 520 separately disposed by a predetermined distance from the antenna 500 is further included, and at one surface of the beam forming auxiliary unit 520 facing electronic waves emitted through the antenna 500, a pattern is formed.

Alternatively, the beam forming auxiliary unit 520 is formed with a film layer and a pattern layer, and the pattern layer may be disposed at one surface of the beam forming auxiliary unit 520 facing electronic waves emitted through the antenna 500.

When the beam forming auxiliary unit 520 having a pattern is disposed between the antenna 500 and the metal bezel 510, it may be determined that an emission pattern of the antenna 500 is different from an emission pattern of FIG. 5A, and in particular, it may be determined that an emission pattern area determined as a distortion that occurred in FIG. 5A is recovered.

Therefore, in a terminal including the beam forming auxiliary unit 520 in which a pattern is formed, because electronic waves emitted through the antenna 500 are emitted without distortion in an entire area, the terminal may perform smooth communication with a base station.

Figure 6:
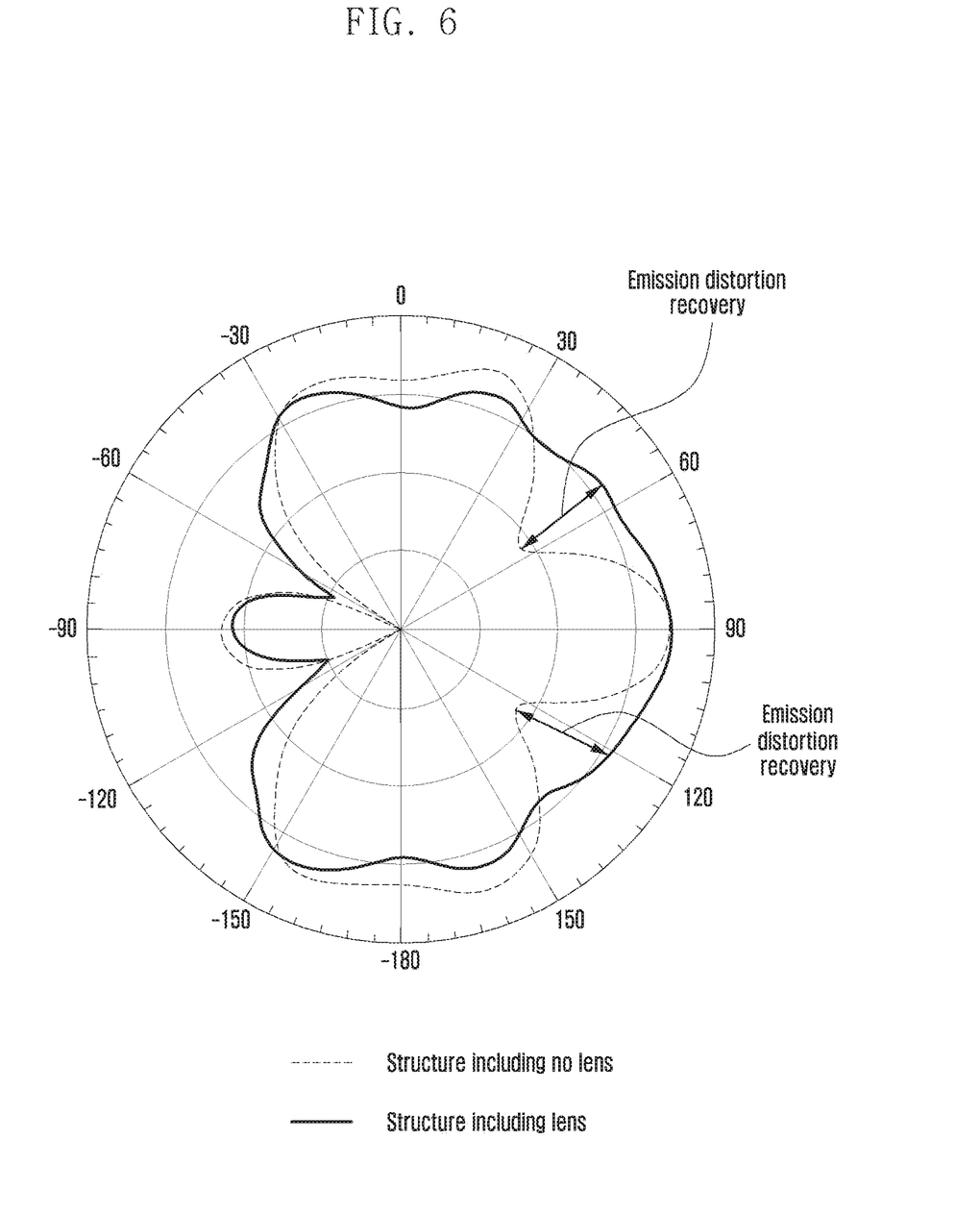
FIG. 6 is a graph comparing emission patterns of a terminal including a beam forming auxiliary unit and a terminal that does not include a beam forming auxiliary unit according to an embodiment of the present disclosure.

FIG. 6 is a graph comparing emission patterns of a terminal including a beam forming auxiliary unit and a terminal that does not include a beam forming auxiliary unit and comparing emission patterns when a lens is configured as a beam forming auxiliary unit according to an embodiment of the present disclosure.

Referring to FIG. 6, an emission pattern recovery effect according to an embodiment of the present disclosure may be determined through a graph. Specifically, in a terminal that does not include a beam form auxiliary unit in which a pattern is formed, it may be determined that electronic waves are not emitted in a direction of 60° and 120° in a YZ plane. That is, electronic waves emitted in the direction of 60° and 120° are scattered or reflected by a metal bezel disposed at the terminal.

However, in a terminal including a beam forming auxiliary unit in which a pattern is formed, it may be determined that entire electronic waves are emitted without distortion in a direction of 60° and 120° of a YZ plane, and it may be determined that electronic waves are uniformly emitted without distortion even in other areas.

Figure 7A:
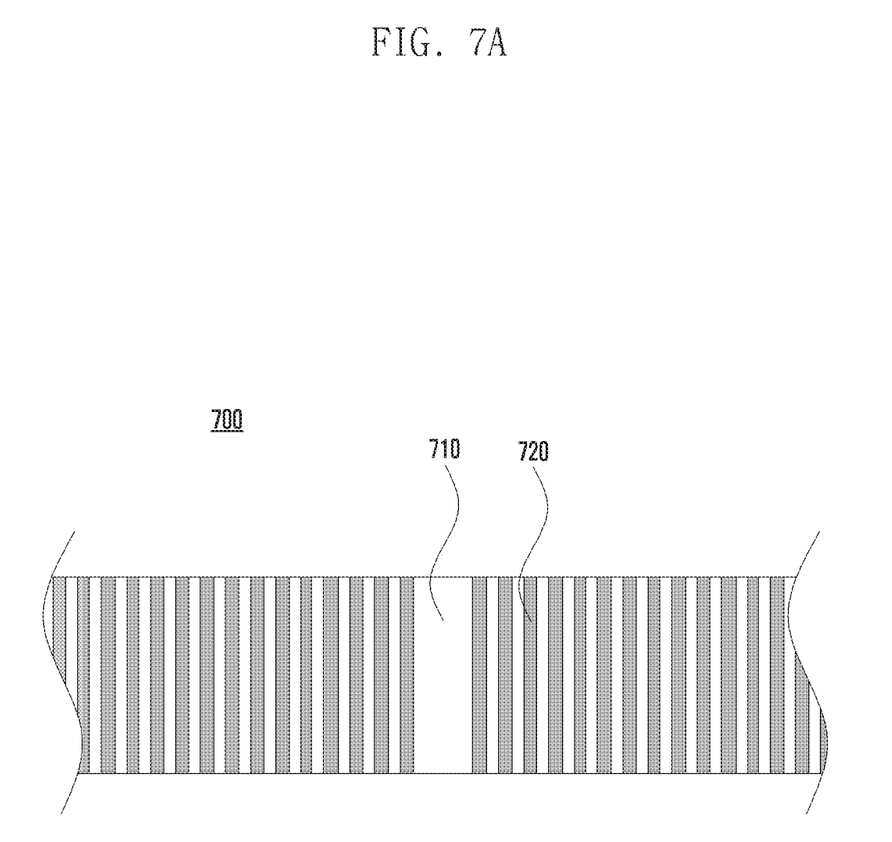
FIG. 7A is a diagram illustrating a pattern shape of a beam forming auxiliary unit according to an embodiment of the present disclosure.

FIG. 7A is a diagram illustrating a pattern shape of a beam forming auxiliary unit according to an embodiment of the present disclosure.

As described above, a pattern of a beam forming auxiliary unit according to an embodiment of the present disclosure may be formed in various shapes. FIG. 3 illustrates, for example, a case in which a pattern is a lattice pattern.

Referring to FIG. 7A, FIG. 7A illustrates a case in which a pattern layer 700 of a vertical line shape is formed in a beam forming auxiliary unit according to an embodiment of the present disclosure. Specifically, the pattern layer 700 includes a first area 710 made of a metal and a second area 720 made of a dielectric material, and the pattern layer 700 of a vertical line shape may be formed through periodic disposition of the first area 710 and the second area 720.

Figure 7B:
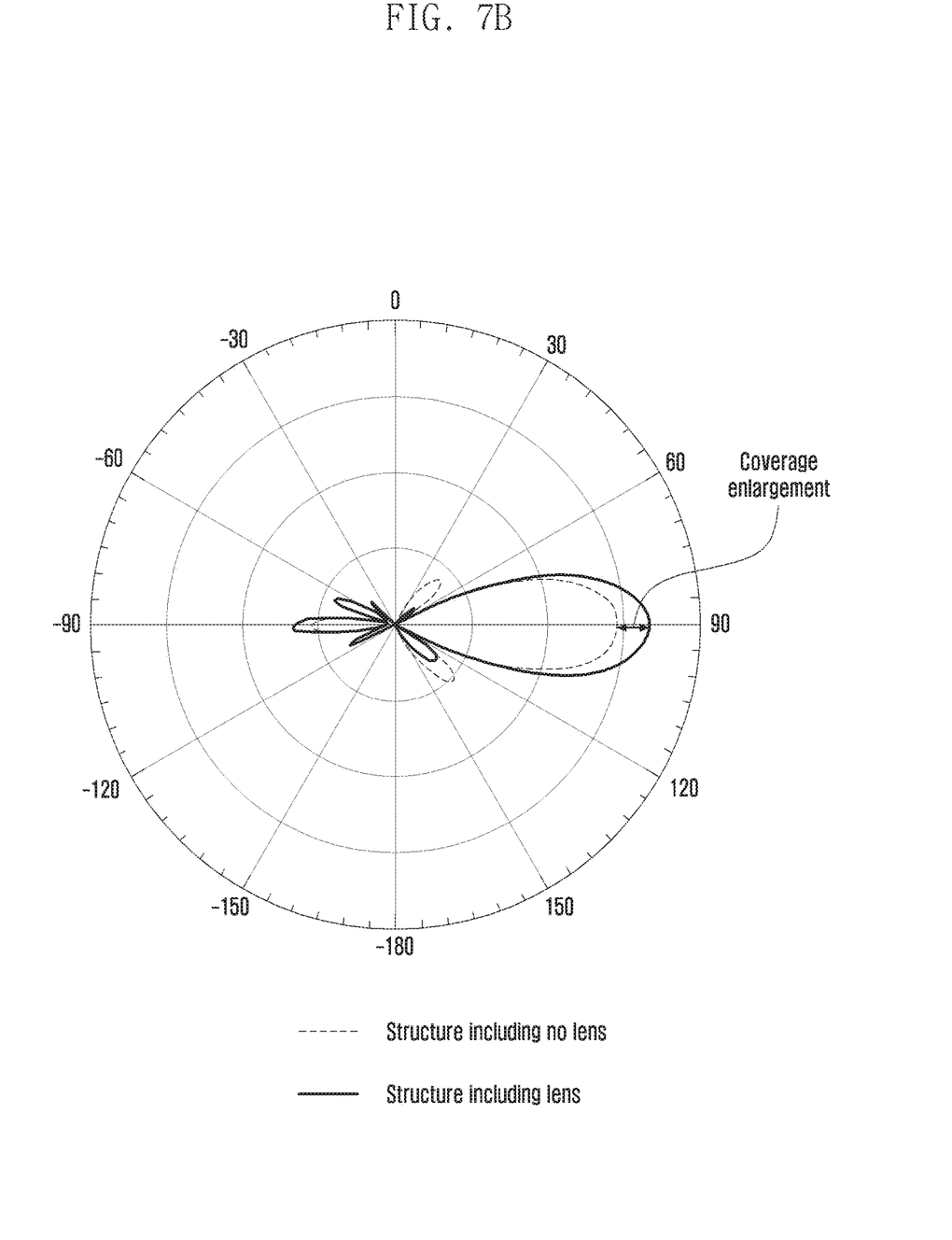
FIG. 7B is a graph comparing emission patterns of a terminal including a beam forming auxiliary unit and a terminal that does not include a beam forming auxiliary unit according to an embodiment of the present disclosure.

FIG. 7B is a graph comparing emission patterns of a terminal including a beam forming auxiliary unit and a terminal that does not include a beam forming auxiliary unit and comparing emission patterns when a lens is configured as a beam forming auxiliary unit according to an embodiment of the present disclosure.

Referring to FIG. 7B, FIG. 7B is a graph illustrating an emission pattern of an antenna in an XY plane. It may be determined that coverage of electronic waves emitted in a direction of 90° of an XY plane is enlarged through the graph.

That is, when a pattern layer or a pattern is formed in a beam forming auxiliary unit according to the present disclosure, a distortion of electronic waves may be prevented through a pattern, and electronic wave coverage may be enlarged by a beam forming auxiliary unit.

Figure 8:
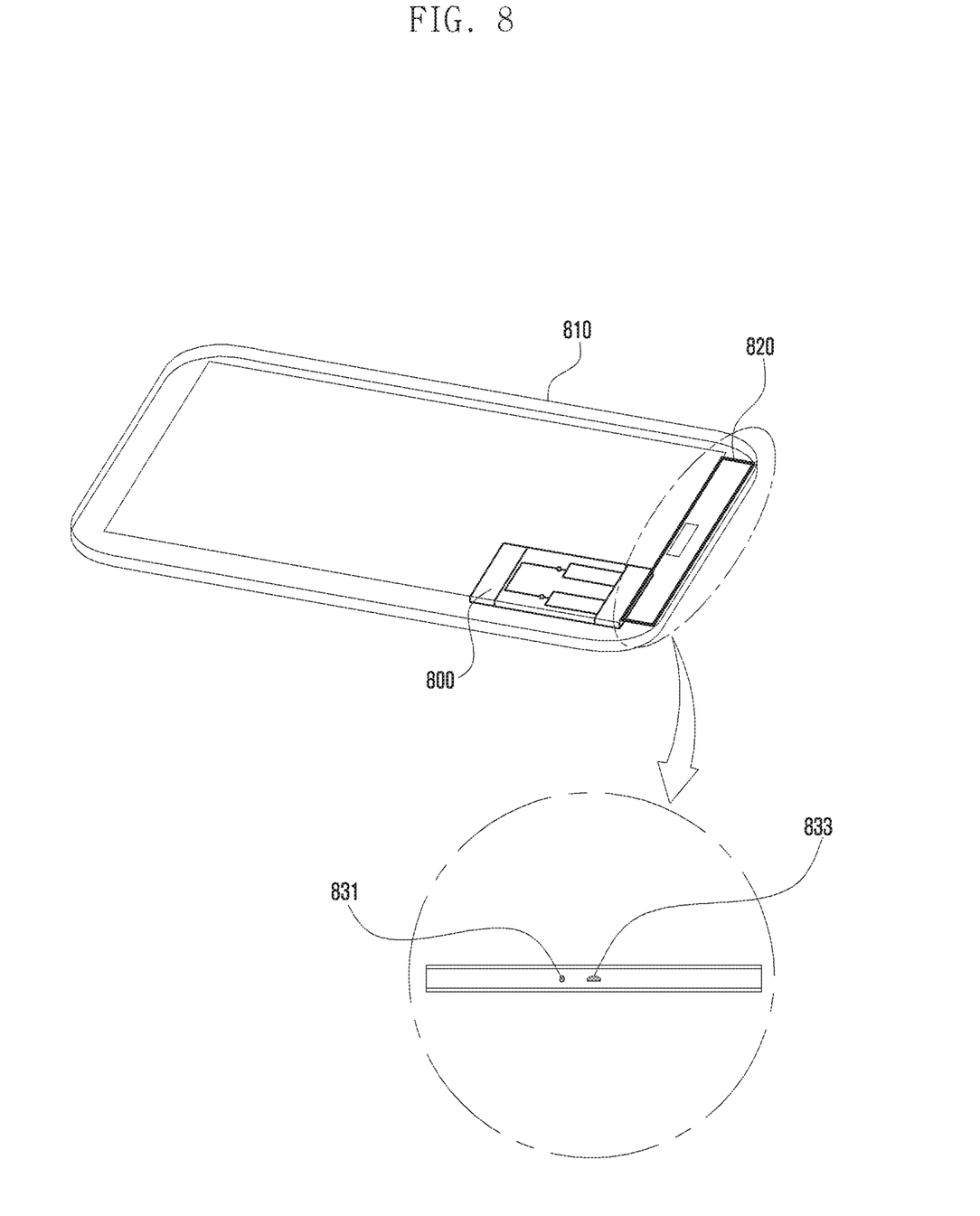
FIG. 8 is a diagram illustrating a case in which a port is formed in a metal bezel including a beam forming auxiliary unit according to an embodiment of the present disclosure.

FIG. 8 is a diagram illustrating a case in which a port is formed in a metal bezel including a beam forming auxiliary unit according to an embodiment of the present disclosure.

Referring to FIG. 8, a terminal according to an embodiment of the present disclosure includes an antenna 800 incorporated into the terminal to emit electronic waves, a metal bezel 810 disposed along an edge of the terminal, and a beam forming auxiliary unit 820 incorporated into the terminal and separately disposed by a predetermined distance from the antenna. A pattern is formed at one surface of the beam forming auxiliary unit 820 that faces electronic waves emitted through the antenna 800.

Here, the beam forming auxiliary unit 820 may be separately formed to be disposed between the antenna 800 and the metal bezel 810, and one surface of the metal bezel 810 may include the beam forming auxiliary unit 820 in which a pattern is formed, as necessary.

In this case, because the beam forming auxiliary unit 820 in which a pattern is formed may be formed together with the metal bezel 810, a process may have an advantage. However, in order to obtain an effect of the present disclosure, the beam forming auxiliary unit 820 having a pattern should be included at one surface of the metal bezel 810 facing electronic waves emitted through the antenna 800.

Further, according to the present disclosure, at one surface of the metal bezel 810 including the beam forming auxiliary unit 820 in which a pattern is formed, at least one port 831 and 833 may be formed, and the port may include a universal serial bus (USB) port or a microphone port.

Figure 9:
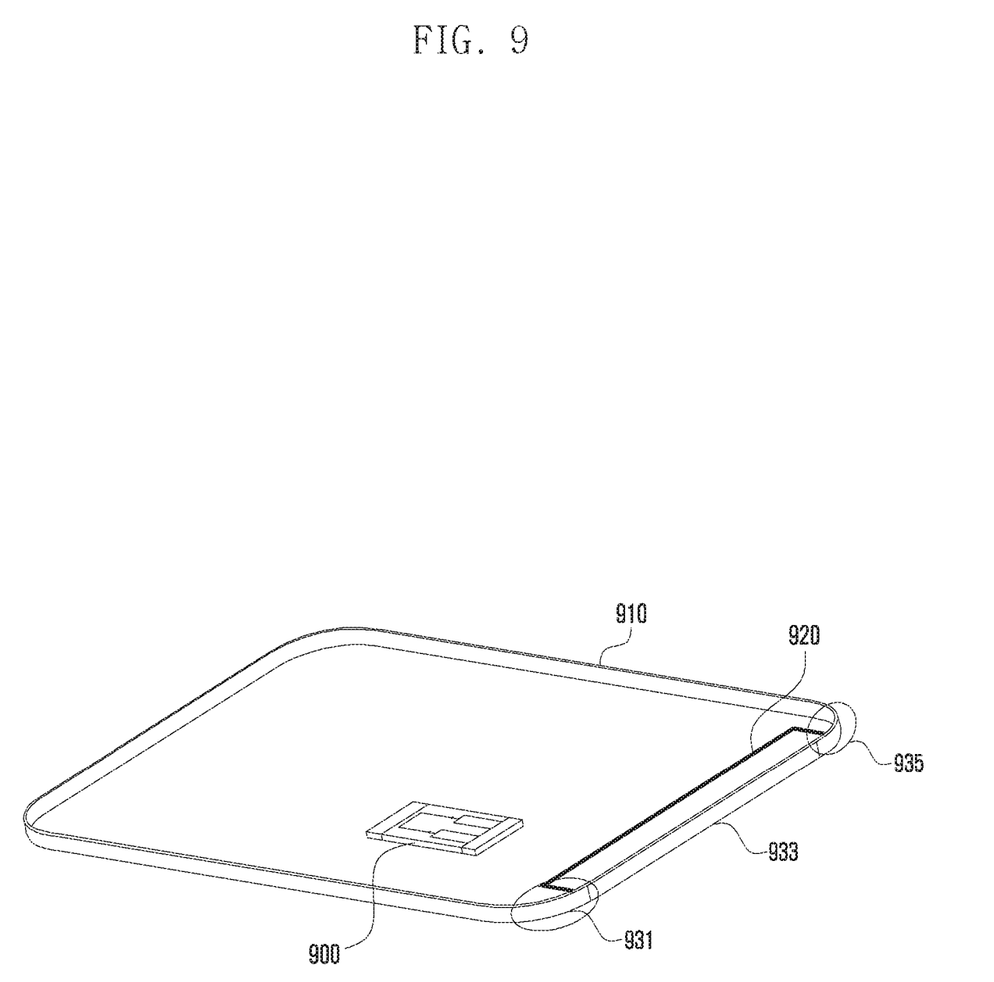
FIG. 9 is a perspective view illustrating a case in which a metal bezel including a beam forming auxiliary unit is divided according to an embodiment of the present disclosure.

FIG. 9 is a perspective view illustrating a case in which a metal bezel including a beam forming auxiliary unit is divided according to an embodiment of the present disclosure.

Referring to FIG. 9, a beam forming auxiliary unit 920 in which a pattern is formed to correspond to FIG. 8 may be formed together with a metal bezel 910, and in this case, the beam forming auxiliary unit 920 having a pattern should be included at one surface of the metal bezel 910 facing electronic waves emitted through an antenna 900.

Further, the metal bezel 910 including the beam forming auxiliary unit 920 having a pattern may be divided into a plurality of metal bezels 931, 933, and 935, and even if the metal bezel 910 is divided into the plurality of metal bezels 931, 933, and 935, the terminal may prevent distortion of electronic waves emitted by the antenna 900 through the beam forming auxiliary unit 920 in which a pattern is formed and may enlarge coverage of electronic waves.

As described above, according to the present disclosure, because an emission pattern of an antenna incorporated into a terminal can be minimized from being distorted by a metal bezel, a gain and coverage of electronic waves of the antenna can be enhanced.

Further, each of the various embodiments may be operated in combination, as necessary. For example, portions of a first embodiment, second embodiment, and third embodiment of the present disclosure may be combined to be operated in a base station and a terminal. Further, the embodiments are suggested based on a long term evolution (LTE) system, but other modified examples based on the spirit and scope of the embodiment may be applied to other systems such as a 5G or new radio (NR) system.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal, comprising:
   a metal bezel disposed along an edge of the terminal;
   an antenna incorporated into the terminal and configured to emit electronic waves; and
   a beam forming auxiliary unit incorporated into the terminal, disposed between the metal bezel and the antenna, and configured to have a pattern to reduce speed of the electronic waves collided with the pattern such that the electronic waves emitted from the antenna is passed.

2. The terminal of claim 1, wherein the pattern is formed at one surface of the beam forming auxiliary unit that faces the electronic waves emitted from the antenna.

3. The terminal of claim 2, wherein unit patterns having a constant shape are periodically arranged in the pattern.

4. The terminal of claim 1, wherein the speed of the electronic waves includes an advancing speed of the electronic waves.

5. The terminal of claim 1,
   wherein the antenna comprises a beamforming antenna, and
   wherein the beam forming auxiliary unit is separately disposed from the beamforming antenna by a predetermined distance that is smaller than a wavelength of the beamforming antenna.

6. The terminal of claim 1, wherein the beam forming auxiliary unit is attached to one surface of the metal bezel.

7. The terminal of claim 1,
   wherein the one surface of the metal bezel is divided into a plurality of areas.

8. The terminal of claim 1, wherein the beam forming auxiliary unit comprises a plane lens.

9. The terminal of claim 1,
   wherein at least one port is formed at one surface of the metal bezel, and
   wherein the at least one port comprises a universal serial bus (USB) port or a microphone port.

10. A terminal, comprising:
    a metal bezel disposed along an edge of the terminal;
    an antenna incorporated into the terminal and configured to emit electronic waves; and
    a beam forming auxiliary unit incorporated into the terminal and separately disposed by a predetermined distance from the antenna,
    wherein the beam forming auxiliary unit comprises:
      a pattern layer configured to have a pattern to reduce speed of the electronic waves collided with the pattern such that the electronic waves emitted through the antenna is passed.

11. The terminal of claim 10, wherein the pattern is formed at one surface of the pattern layer such that the electronic waves emitted from the antenna is passed.

12. The terminal of claim 10, wherein the pattern layer comprises a first area made of a metal and a second area made of a dielectric material.

13. The terminal of claim 10, wherein unit patterns having a constant shape are periodically arranged in the pattern layer.

14. The terminal of claim 10, wherein the speed of the electronic waves includes an advancing speed of the electronic waves.

15. The terminal of claim 10, further comprising a film layer disposed between the metal bezel and the pattern layer.

16. An antenna assembly, comprising:
    an antenna configured to emit electronic waves; and
    a beam forming auxiliary unit separately disposed by a predetermined distance from the antenna and configured to reduce an advancing speed of the electronic waves emitted from the antenna.

17. The antenna assembly of claim 16, wherein a pattern is formed at one surface of the beam forming auxiliary unit that faces the electronic waves emitted through the antenna to reduce the advancing speed of the electronic waves emitted from the antenna.

18. The antenna assembly of claim 17, wherein unit patterns having a constant shape are periodically arranged in the pattern.

* * * * *